(12) United States Patent
Nataraj et al.

(10) Patent No.: US 8,714,571 B2
(45) Date of Patent: May 6, 2014

(54) TORQUE ROD

(75) Inventors: Sachin Nataraj, Flemington, NJ (US); Thanwant Khanduja, Bridgewater, NJ (US); Chiranjeev Khanduja, Bridgewater, NJ (US)

(73) Assignee: Automann Inc., Somerset, NJ (US)

( * ) Notice: Subject to any disclaimer, the term of this patent is extended or adjusted under 35 U.S.C. 154(b) by 38 days.

(21) Appl. No.: 12/974,361

(22) Filed: Dec. 21, 2010

(65) Prior Publication Data
US 2011/0227307 A1 Sep. 22, 2011

Related U.S. Application Data

(60) Provisional application No. 61/314,396, filed on Mar. 16, 2010.

(51) Int. Cl.
*B60G 21/055* (2006.01)
*B62D 7/16* (2006.01)
*B60G 11/18* (2006.01)

(52) U.S. Cl.
USPC .......... 280/124.107; 280/93.511; 280/124.13; 403/27; 74/580

(58) Field of Classification Search
CPC ........................................................ B62D 7/16
USPC ............... 280/93.51, 124.1, 93.511, 124.106, 280/5.511, 679, 684, 124.13, 124.137, 280/124.149, 124.166, 124.152, 665, 280/93.507, 124.107; 180/352; 403/27, 403/180, 46; 74/586
See application file for complete search history.

(56) References Cited

U.S. PATENT DOCUMENTS

| | | | | |
|---|---|---|---|---|
| 1,293,872 A | * | 2/1919 | Murray | 219/137 R |
| 2,863,685 A | * | 12/1958 | Boyce | 403/27 |
| 3,430,995 A | * | 3/1969 | Herbenar et al. | 403/51 |
| 3,791,751 A | * | 2/1974 | Vey | 403/311 |
| 3,938,822 A | * | 2/1976 | Guerriero | 280/86.758 |
| 3,969,032 A | * | 7/1976 | Wolicki | 403/310 |
| 4,010,629 A | * | 3/1977 | Wolicki | 72/368 |
| 4,020,929 A | * | 5/1977 | Goldin | 188/321.11 |
| 4,146,340 A | * | 3/1979 | Smith, Jr. | 403/27 |
| 4,189,249 A | * | 2/1980 | Gaines et al. | 403/27 |
| RE31,013 E | * | 8/1982 | Smith, Jr. | 403/27 |
| 4,367,968 A | * | 1/1983 | Ishida | 403/122 |
| 4,607,975 A | * | 8/1986 | Lo | 403/24 |
| 5,104,136 A | * | 4/1992 | Buhl et al. | 280/93.5 |
| 5,277,860 A | * | 1/1994 | Sinclair | 264/242 |
| 5,529,316 A | * | 6/1996 | Mattila | 280/93.51 |
| 5,564,521 A | | 10/1996 | McLaughlin et al. | |
| 5,662,360 A | * | 9/1997 | Guzowski | 285/110 |
| 6,019,383 A | * | 2/2000 | Kociba et al. | 280/124.134 |
| 6,190,080 B1 | * | 2/2001 | Lee | 403/135 |
| 6,257,795 B1 | * | 7/2001 | Stroh | 403/131 |
| 6,533,491 B1 | * | 3/2003 | Redele | 403/138 |
| 6,685,377 B2 | * | 2/2004 | Nakata et al. | 403/135 |
| 6,695,521 B2 | * | 2/2004 | Kincaid et al. | 403/132 |
| 7,201,530 B2 | * | 4/2007 | Wappes et al. | 403/27 |
| 7,481,595 B2 | * | 1/2009 | Urbach | 403/149 |

(Continued)

*Primary Examiner* — Karen Beck
(74) *Attorney, Agent, or Firm* — Gottlieb, Rackman & Reisman, PC

(57) ABSTRACT

The present invention is directed to a torque rod comprised of a two piece mating design which increases rigidity and reduces the number of welds. Unlike other designs this design has single piece forged ends which permits the torque rod of the present invention to take greater payloads than other designs can take. The design further includes internal bearings.

17 Claims, 8 Drawing Sheets

(56) References Cited

U.S. PATENT DOCUMENTS

| | | |
|---|---|---|
| 7,520,691 B2 * | 4/2009 | Dearing et al. ............... 403/135 |
| 7,547,028 B1 * | 6/2009 | Blaszynski et al. ........ 280/93.51 |
| 7,798,503 B2 | 9/2010 | McLaughlin et al. |
| 7,988,379 B2 * | 8/2011 | Jan et al. ....................... 403/141 |
| 8,376,647 B2 * | 2/2013 | Kuroda ......................... 403/134 |
| 2004/0222610 A1 * | 11/2004 | McLaughlin ............... 280/124.1 |
| 2005/0040644 A1 * | 2/2005 | Tawara et al. ..................... 285/7 |
| 2008/0284122 A1 * | 11/2008 | Kwon ...................... 280/93.511 |
| 2009/0234452 A1 * | 9/2009 | Steiner et al. .............. 623/14.12 |
| 2011/0227307 A1 * | 9/2011 | Nataraj et al. ............. 280/124.1 |
| 2012/0001397 A1 * | 1/2012 | McLaughlin ............... 280/124.1 |

* cited by examiner

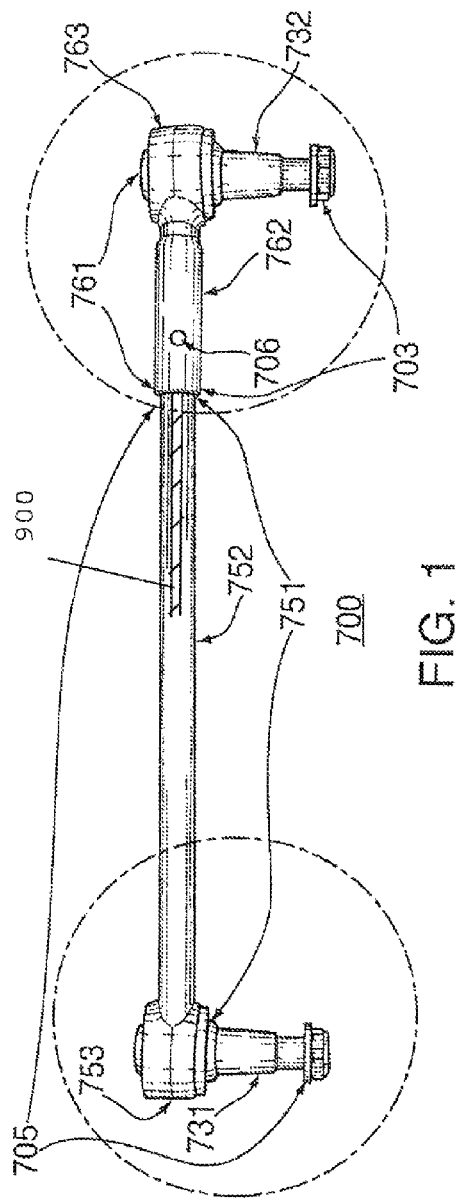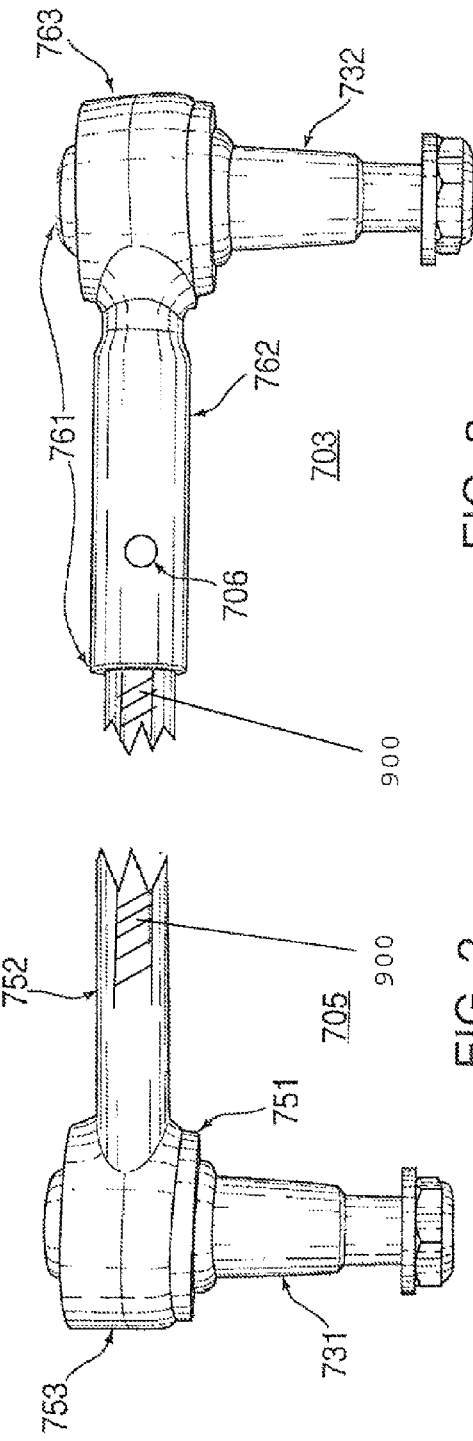

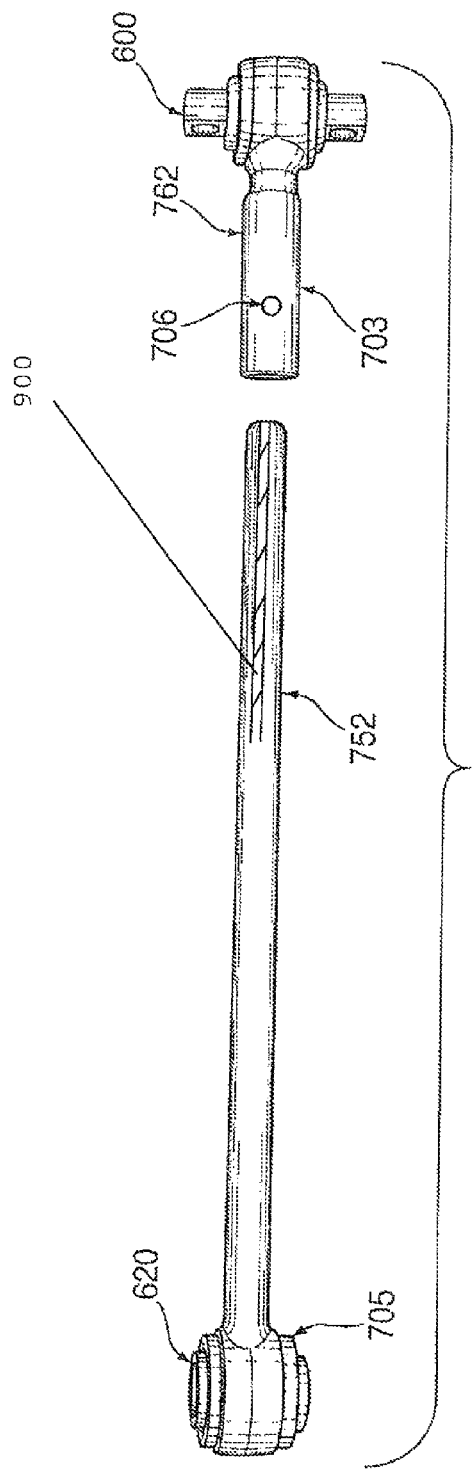
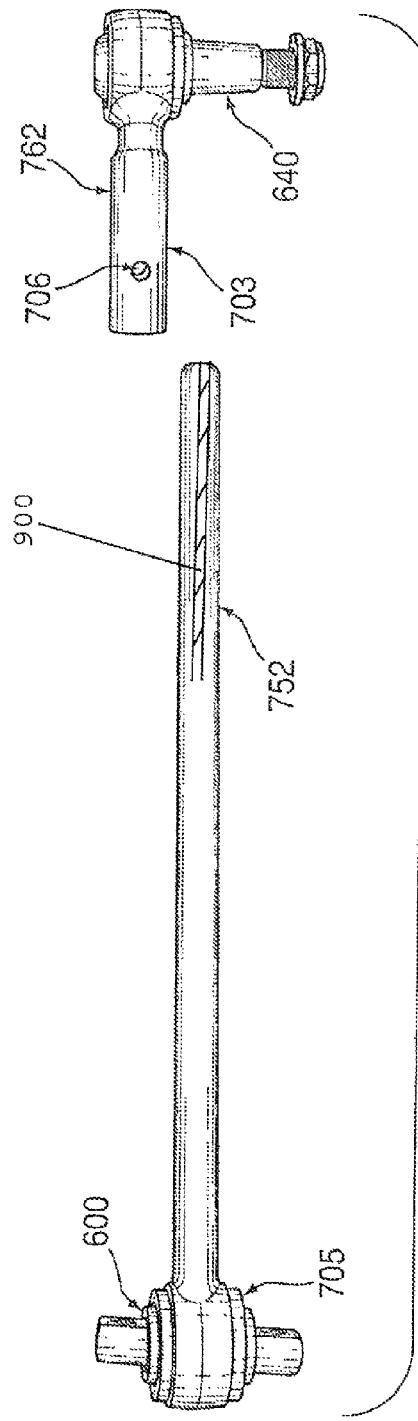
FIG. 4
FIG. 5

TORQUE ROD

This application claims priority to U.S. Provisional Patent Application No. 61/314,396, filed on Mar. 16, 2010.

BACKGROUND OF THE INVENTION

Torque rods are used to stabilize an axle by transforming motion. They prevent the axle from spinning, prevent fore-aft movements during braking and accelerations, and they prevent axle yaw. Truck, trailer and bus suspensions also utilize torque rods to secure a drive axle to the vehicle's frame. Torque rods are used both as transverse rods to secure the drive axle to a vehicle's frame and as longitudinal rods to attach the suspension system to the vehicle axle. By securing the drive axle to the vehicle's frame using a torque rod, the drive axle's alignment to the vehicle's frame is maintained, and the proper suspension geometry for the vehicle is also maintained, so that free suspension movement is allowed by transferring torque created by the suspension movement on irregular terrain. The longitudinal connection of the suspension system to the axle helps in aligning the axle and acts as a kinematic chain.

Straight arm torque rods have been constructed using any of a welded tube design, cast design, welded solid rod design, or other designs like single piece forged designs. Typically, multiple welds are needed. Three-piece designs were also available with two solid rods welded to the end housings and an intermediate pipe, used to join the pieces together. The bushing ends have been constructed using cartridge type bushings, bonded bushings and also using other polymer designs.

Due to varying operating conditions for vehicles, severe impact loads combined with road vibrations on the suspension cause the components of the suspension, including the torque rods, to be subjected to wear. Dynamic loading conditions can accelerate wear of suspension system components and also lead to fatigue of the vehicle's operator, which may lead to premature failure of several components including torque rods.

There are two primary designs used for torque rods. The first design is a straight arm torque rod with pivot bushings on either end. The second design is the use of wishbone shaped (V-shaped) torque rods with pivotal bushings at the apex and either end of the legs. This latter design controls both fore-aft movements as well as lateral movements. Each application of a torque rod requires a rod that meets the specific needs of that particular vehicle. Because different vehicles require different torque rods, the manufacturing process results in various rods for the various vehicles. Often, mechanics installing torque rods need to cut them for fit, and once cut need to weld the pieces together. Often, multiple cuts and welds are needed. In addition, torque rods in use can fracture or break due to loads or because of wear. Wear may result from poor welds or from abrasives or other contaminants entering the area of the bearings. It would be advantageous to design a torque rod which can sustain high loads while in use, includes protection against excess wear, which can be readily replicated in manufacture, and also be used on a variety of vehicles requiring different length torque rods.

BRIEF DESCRIPTION OF THE PRESENT INVENTION

The present invention is directed to a design related to the first type of straight arm torque rod; however it can also be adapted for use in V-shaped torque rod as well. The present invention is comprised of a male assembly and a female assembly which, when assembled together, matingly come together by insertion of an elongated end of the male assembly into an elongated end of the female assembly to create a complete torque rod. Each male and female assembly includes an outer portion and an inner portion. Each outer portion has an extended portion (an "elongated leg") and a "top" member. Each outer portion is made of forged steel and is hollow in its entirety.

The present invention is an improvement over prior torque rods. The torque rod of the present invention is comprised of a two piece mating design which increases rigidity and reduces the number of welds. Unlike other designs this design has single piece forged ends which permits the torque rod of the present invention to take greater payloads than other designs can take.

Because different applications require different length torque rods, the present invention allows for standardized manufacture of the male and each female outer portions. The elongated legs of the outer portions may be cut by a craftsperson for the particular application of use. One additional advantage to the present invention is that the craftsperson has some flexibility in cutting the outer portions and need not cut with fine precision, or even at all, because the male portion and female portion matingly come together. In addition, the cut may be made at the time of assembly.

When mated and used in a vehicle, it is important for vehicle stability to assure that the top members are properly parallel to each other. The male assembly's elongated leg, which matingly fits inside of the female assembly's elongated leg, includes an alignment groove imprinted on the elongated leg and which runs for at least a portion of the male assembly's elongated leg along its center line. The female assembly's elongated leg includes an alignment hole. When an operator mates the assemblies such that the alignment line is visible through the alignment hole, the male section's top member and the female section's top member are aligned parallel to each other. The two piece design has an added weld alignment hole (plug or fillet hole) and alignment groove which gives the installer a visual aid to align the ends of the torque rod and provides better weld quality due to the weld filler being able to fuse better through the fillet hole.

As stated, each outer portion's top member is hollow. However, each top member is "filled" with one of several optional inner portions, with the selection of assembly based upon the particular application. Any particular torque rod may have the same or different inner portions in the two top members. Each inner portion includes a bearing assembly, which is sealed within the inner portion. Each inner portion is formed so as to allow flexibility appropriate for the particular vehicle yet is sealed so as to assure abrasives or other undesirable elements do not enter the area near the bearing so as to improve wear. The more typical inner portions are referred to here as straddle pins, ball studs, or hollow balls.

The improvements in the present invention include a steel outer cap and sealed ends which protects the inner components from dust and grime from puncturing the seal. Unlike other designs, this design includes top bearings which prevent contact between the main bearing and top outer ring. Unlike customary torque rods, the present invention includes a single unit center bearing, which increases contact patch with the radial full ball inner pin thus reducing friction and increasing the lubrication containment. The engineered thermoplastic material used provides good creep resistance, dimensional stability, high impact resistance, high molecular weight, stiffness, strength and toughness. In addition, the steel lower bearing is made of St35 steel, unlike the materials used in conventional torque rods. This provides support to a radial ball in the inner assembly and contains excessive vertical movements of the inner assembly which further provides added rigidity and a better ride. Finally another new feature is the fillet hole and alignment groove which give accurate visual indication of alignment and also help in distribution of filler material while welding. This makes the mating design very secure.

The present invention is directed towards reduced cost while providing superior performance characteristics of torque rods. The benefits of such a design include improved and less expensive installation and improved durability by allowing for customization during installation. The two-piece design is constructed using a single weld. The single weld design provides improved strength over a multiple weld design and cuts down on labor involved. The unique head housing design features inner components that give optimal articulation and reduced friction for prolonged life. The steel cap/housing containment mechanism makes bearing system more stable and provides ideal working torque.

The present invention has a full radial ball design which provides greater articulation and less internal friction which prolongs the life of the torque rod. The present invention has sealed-in lubricant which provides continuous lubrication enhancing the working of the torque rod. The containment mechanism is protected by an outer steel cap which prevents dust and grime from puncturing the seal thus protecting the inner components of the sealed ends from abrasive elements. The present invention has a top bearing made of a high performance Thermoplastic Polyurethane, which prevents the contact of the metal top ring with the main bearing. The polyurethane also improves elastic memory and hydrolytic stability over earlier designs, making the whole unit more rigid and longer lasting while providing improved performance. In the preferred embodiment, the present invention also incorporates a single unit center bearing made from polyoxymethylene, also known as POM, polyacetal or polyformaldehyde, which is an engineered thermoplastic belonging to the family of homopolymer acetal, such as Delrin 100 NC 10 TM from the DuPont Corporation. The bearing provides contact patch for the entire radial ball thus reducing friction and increasing the lubrication containment. Polyoxymethylene is used in part because it provides good creep resistance, dimensional stability, high impact resistance, high molecular weight, stiffness, strength and toughness. The present invention has a lower bearing that is made of St35 Steel and the lower bearing provides support to the radial ball and contains excessive vertical movements of the inner pin. This provides added rigidity and better ride.

Features available in the present invention include:

Male-Female Mating Design—This design provides greater rigidity and requires fewer welds compared to three piece design.

Single Piece Forged Ends—This design provides longer life and greater payloads as the single piece forged design increases structural integrity over traditional welded design.

Sealed Housing Ends—The sealed design keeps out abrasive external elements from wearing out the internal components. The housing ends are constructed with C45 high grade steel which provides yield strength of 50,000-58,000 PSI.

Full Radial Ball Inner Pin—The full radial ball provides greater articulation and less internal friction which prolongs the life of the torque rod. The Radial ball inner pins are made with 42CrMo4 steel which has yield strength of 79,700-116,000 PSI.

Sealed-in Lubrication—Sealed in grease provides continuous lubrication enhancing the working of the torque rod and providing longer life.

Outer Steel Cap—The outer steel cap which is welded to the housing prevents dust and grime from puncturing the seal thus protecting the inner components of the sealed ends from abrasive elements.

Top Bearing—The top bearing is made out a high performance Thermoplastic Polyurethane, or an equivalent, prevents the contact of metal top ring with the main bearing. It increases elastic memory and hydrolytic stability, making the whole unit more rigid and long lasting while providing optimal performance.

Single Unit Center Bearing—The present invention includes a single center bearing made from an engineered thermoplastic. The bearing provides contact patch for the entire radial ball thus reducing friction and increasing the lubrication containment. The engineered thermoplastic provides good creep resistance, dimensional stability, high impact resistance, high molecular weight, stiffness, strength and toughness Lower Bearing—The lower bearing is made of St35 Steel or equivalent and provides support to the radial ball and contains excessive vertical movements of the inner pin. This provides added rigidity and better ride.

Lower Cap (used only in torque rod ends with a taper stud design) The lower cap is a containment mechanism for torque rod ends using the taper stud design. The lower cap is made of St3 K32 Steel or equivalent.

Fillet hole and alignment groove—The fillet and alignment groove gives the installer a visual aid to align the ends of the torque rod and provides better weld quality due to the weld filler being able to fuse better through the fillet hole.

BRIEF DESCRIPTION OF THE DRAWINGS

FIG. 1 shows a perspective view of assembled male and female torque rods.

FIG. 2 shows a perspective view of one end of the torque rod of the present invention including a portion of the male outer assembly and an inner assembly and particularly showing the alignment groove.

FIG. 3 shows a perspective view of one end of the torque rod of the present invention including a portion of the female outer assembly and an inner assembly and particularly showing the fillet hole.

FIG. 4 shows an exploded view of one embodiment of the present invention including a hollow ball and a straddle ball.

FIG. 5 shows an exploded view of another embodiment of the present invention including a straddle ball and a taper ball stud.

DETAILED DESCRIPTION OF THE PRESENT INVENTION

Figure 6:
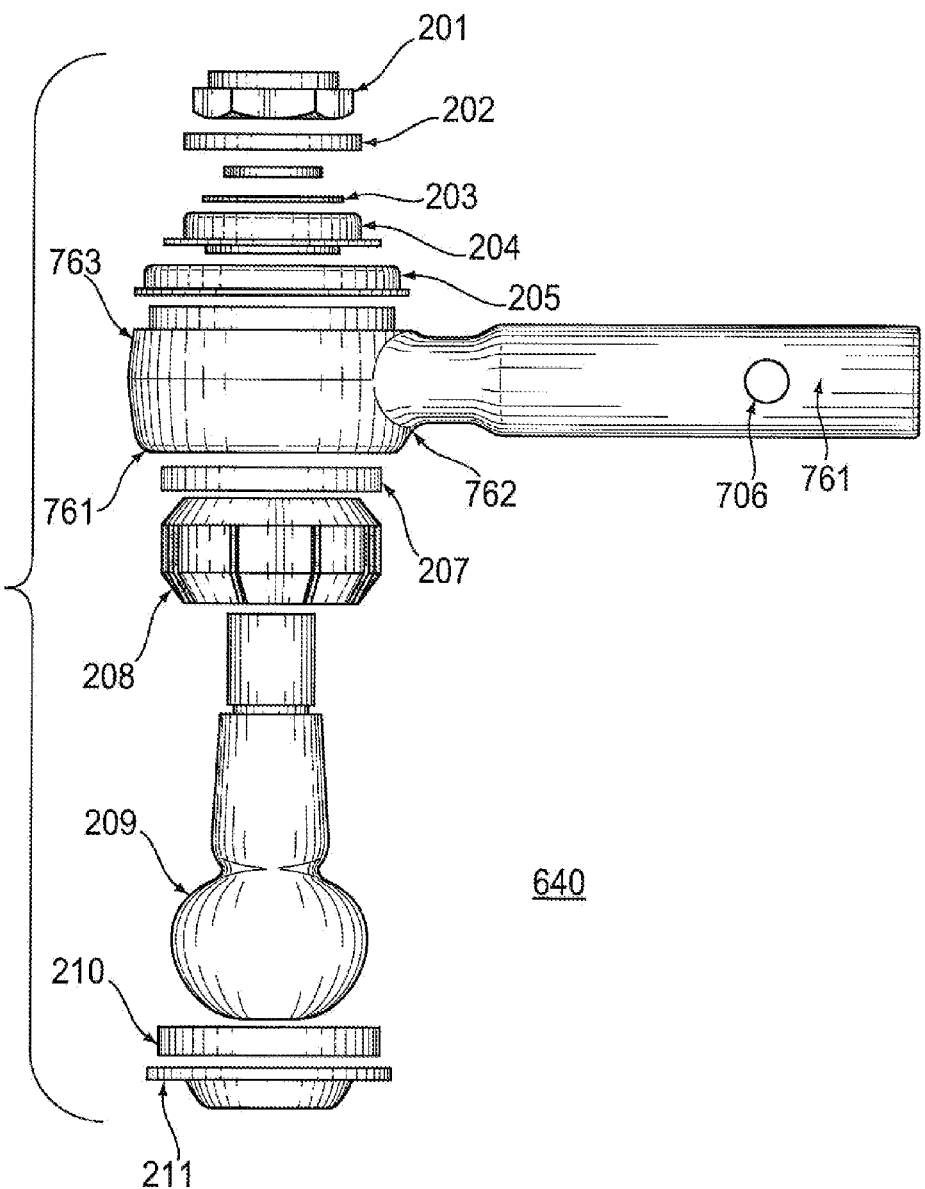
FIG. 6 shows an exploded view of a taper ball stud assembly of the present invention.

The present invention is directed to a torque rod comprising a hollow shaft joint assembly with a sealed internal pin assembly, where the pin has a radial ball design. As can be seen in FIG. 1, a second joint assembly with a solid shaft mates into the first joint assembly. The torque rod is prepared by cutting the shaft of the second joint to a desired length and welding the male and female assemblies. In the present invention, the "top" member and the "elongated" leg are forged as a single piece. In one embodiment, the inner pins have a radial design. In another embodiment, the pin is interfaced in the head housing with a plastic or POM collar bearing. In another embodiment, the pin and bearing are contained in the head housing with support rings typically made out of the same material. The entire construction of the head housing is covered with a dust boot, which is clamped to the housing by means of a clamping ring. When a dust boot is used, it may be used on both sides of the housing when a straddle pin is used. The dust boot may be used on one end with a clamping ring and a metal cap may be used on the other side when a taper stud is used. In another embodiment, the head housing is welded to the shaft. In another embodiment, a male and female two piece mating design may be used, and such a design may include a non-replaceable pin. When a dust boot is used, an outer steel cap may be used to cover an inner dust boot. In another embodiment, a solid shaft may be used to weld or forge the end housings with the said containment mechanism and pin instead of the male-female design. In another embodiment, the radial inner pin is replaced by a convoluted inner pin.

Referring to FIGS. 1-3, FIG. 1 depicts a view of an assembled torque rod 700 of the present invention. Torque rod 700 is comprised of male assembly 705 and female assembly 703. Male assembly 705 is comprised of male outer portion 751 and male inner portion 731. Male outer portion 751 is further comprised of male elongated leg 752 and male top member 753, which are forged as a single unit. Male outer portion 751 is made of a hardened steel and may be further coated by a rust preventer to improve longevity. Male outer portion 751 is hollow on the inside. Male elongated leg 752 is cylindrical in shape with a nominal diameter of 1.25 inches (32 mm) with typical lengths in the range of 30.0 inches to 30.5 inches. Male top member 753 is also cylindrical in shape with an opening at 90 degrees to that of elongated leg 752, and with a nominal diameter of 3.74 inches (95 mm).

Female assembly 703 is comprised of female outer portion 761 and female inner portion 732. Female outer portion 761 is further comprised of female elongated leg 762 and female top member 763, which are forged as a single unit. Female outer portion 761 is made of hardened steel and may be further coated by a rust preventer to improve longevity. Female outer portion 761 is hollow on the inside. Female elongated leg 762 is cylindrical in shape with a nominal diameter of 1.75 inches (44.5 mm) and nominal wall thickness of 0.24 inches (6.17 mm) with typical lengths in the range of 5.90 inches tube to 8.5 inches" center to tube end. Female top member 763 is also cylindrical in shape with an opening at 90 degrees to that of elongated leg 762, and with a nominal diameter of 3.74 inches (95 mm). Female elongated leg 762 also includes alignment hole 706, which is placed at a point on the center line of female elongated leg 762.

FIG. 2 depicts an exploded view of a portion of male assembly 705, comprised of male outer portion 751 and male inner portion 731. As shown in FIG. 2, inner portion 731 is of a ball stud design, but other designs may be used instead. In addition, alignment groove 300 is etched into male elongated leg 752 for later attachment to female assembly 763.

FIG. 3 depicts an exploded view of female assembly 703 when mated with male assembly 705 and comprised of female outer portion 731 and female inner portion 732. Female outer portion 731 is further comprised of fillet hole 706. When properly aligned in mating, alignment groove 900 is visible through fillet hole 706 and weld filler (or weld plug) can be applied in fillet hole 706 for welding with the channel serving both for alignment and improved welding purposes. As shown in FIG. 3, female inner portion 732 is inclusive of a ball stud design, but other designs may be used instead.

FIGS. 4-5 show additional unassembled male and female assemblies with different inner portions. FIG. 4 shows hollow ball 620 in the male assembly and straddle ball 600 in the female assembly. FIG. 5 shows straddle ball 600 in the male assembly and ball stud 640 in the female assembly.

FIGS. 4-5 also show the mating design of the torque rods. Female elongated end 762 receives male elongated end 752. The internal diameter of female elongated end 762 is machined with an indentation in such a way to provide a snug fit for male elongated end 752. Male elongated end 752 has an alignment groove 900 that is visible inside of fillet hole 706 of female elongated end 762 when assembled. The groove helps the installer align the shafts such that the end housings and radial pins are straight and not angled. Fillet hole 706 also helps as a diffuser of weld filler or weld plug and helps in distributing it for a sturdy welded joint.

FIG. 6 shows an exploded view of ball stud 640 in a female assembly. Although shown in FIG. 6 with female outer portion 761, the invention also includes male outer portion 751 in place of female outer portion 761. Female outer portion 761, comprised of female top member 763 and female elongated leg 762 with fillet hole 706, is made of high grade C45 steel such as SAE 1045 and, in the preferred embodiment, is of nominal diameter of approximately 3.5", which may vary, typically by 20%, based upon the application of use.

Female outer portion 761 is held in place in one direction by upper cap 205 and dust boot 204, which are attached to female outer portion 761 by use of ring 203, washer 202, and nut 201. Upper cap 205 is typically comprised of St 3 K32 or equivalent. Dust boot 204 is comprised of a thermoplastic.

In the lower direction, female outer portion 761 is held in place by top bearing 207, which rests within female outer portion 761 and center bearing 208. Ball pin 209 is fit inside center bearing 208 and is shaped as a radial ball. And provides for rotational movement of the torque rod of the present invention. Lower bearing 210 encircles ball pin 209 and lower cap 211 is used to protect the lower assembly from dirt and other contaminants.

Figure 7:
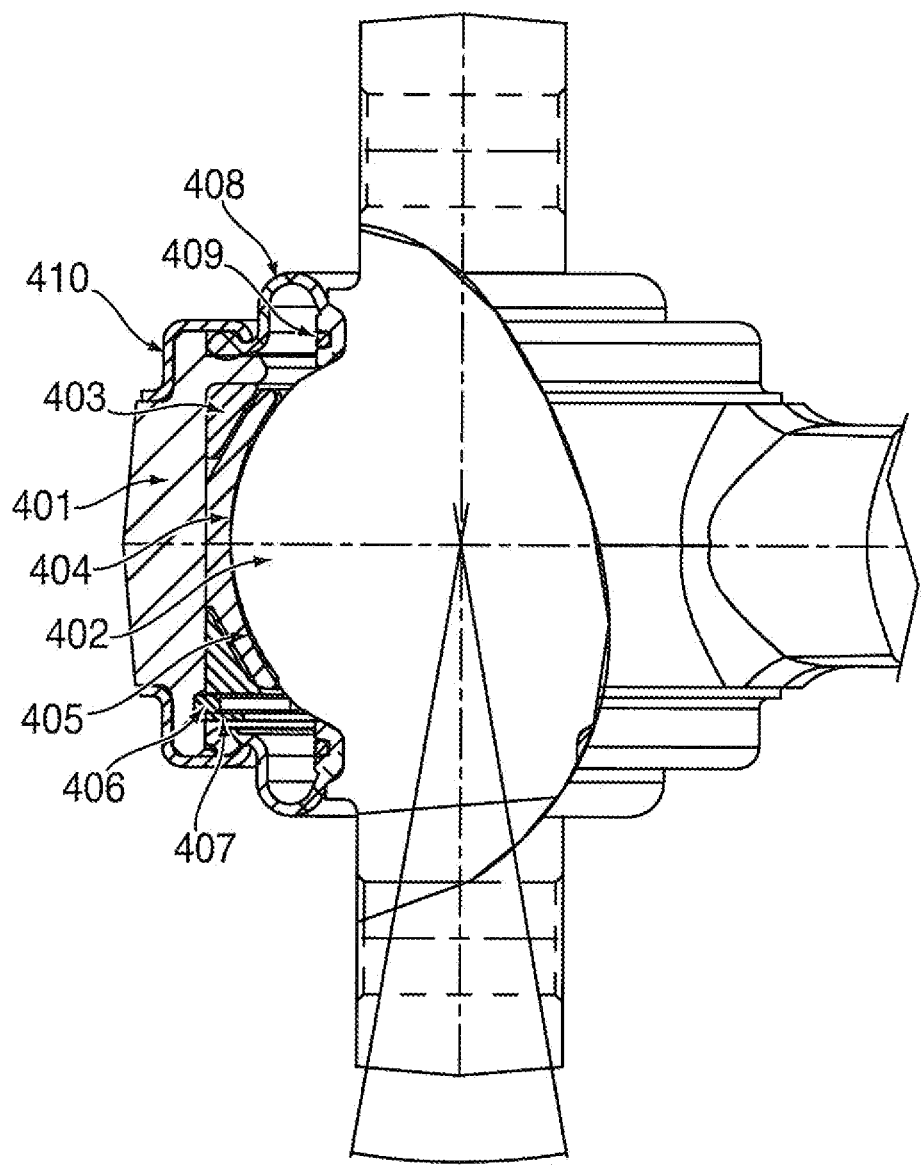
FIG. 7 shows an exploded view of the present invention with a representative combination of an inner assembly with an outer assembly.
Figure 8:
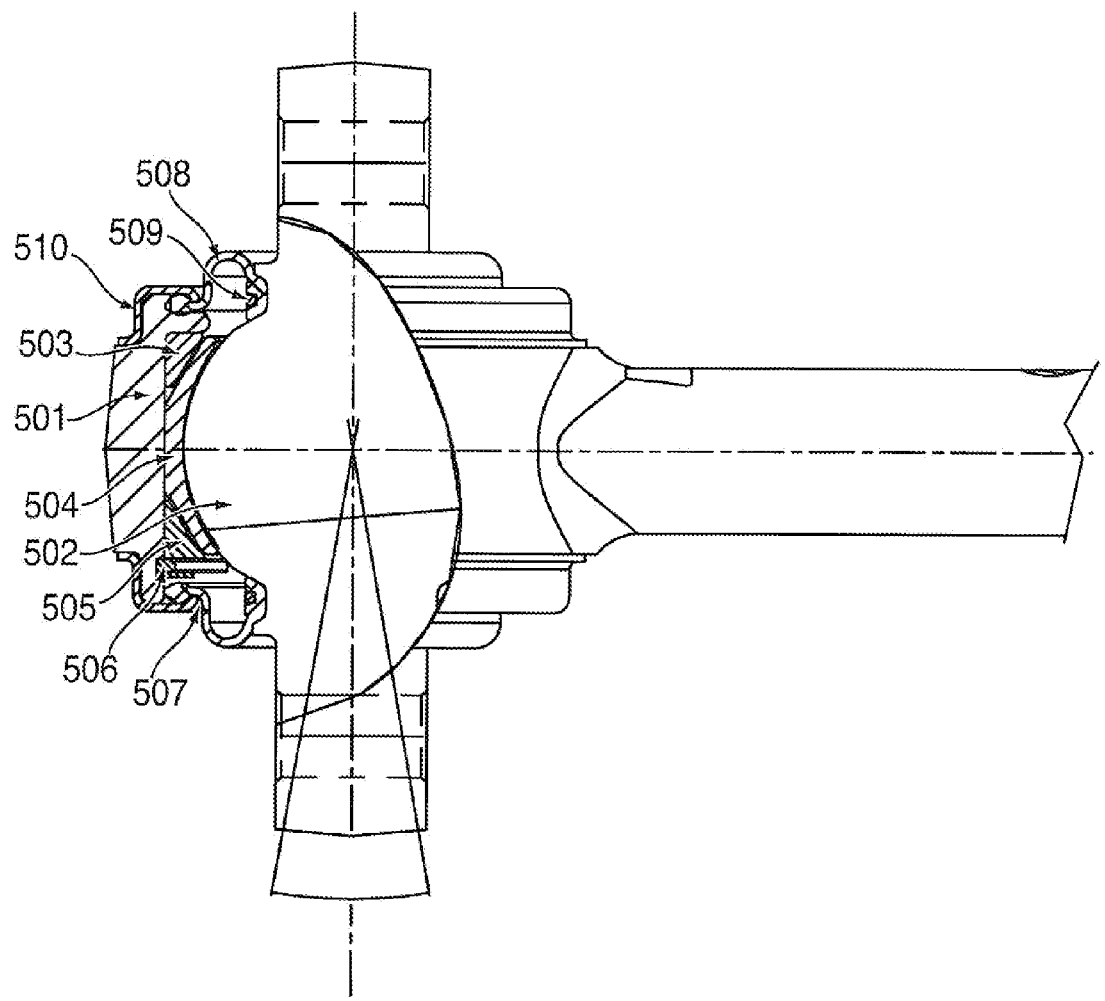
FIG. 8 shows an exploded view of an embodiment of the present invention of male assembly with a straddle ball inner assembly.
Figure 9:
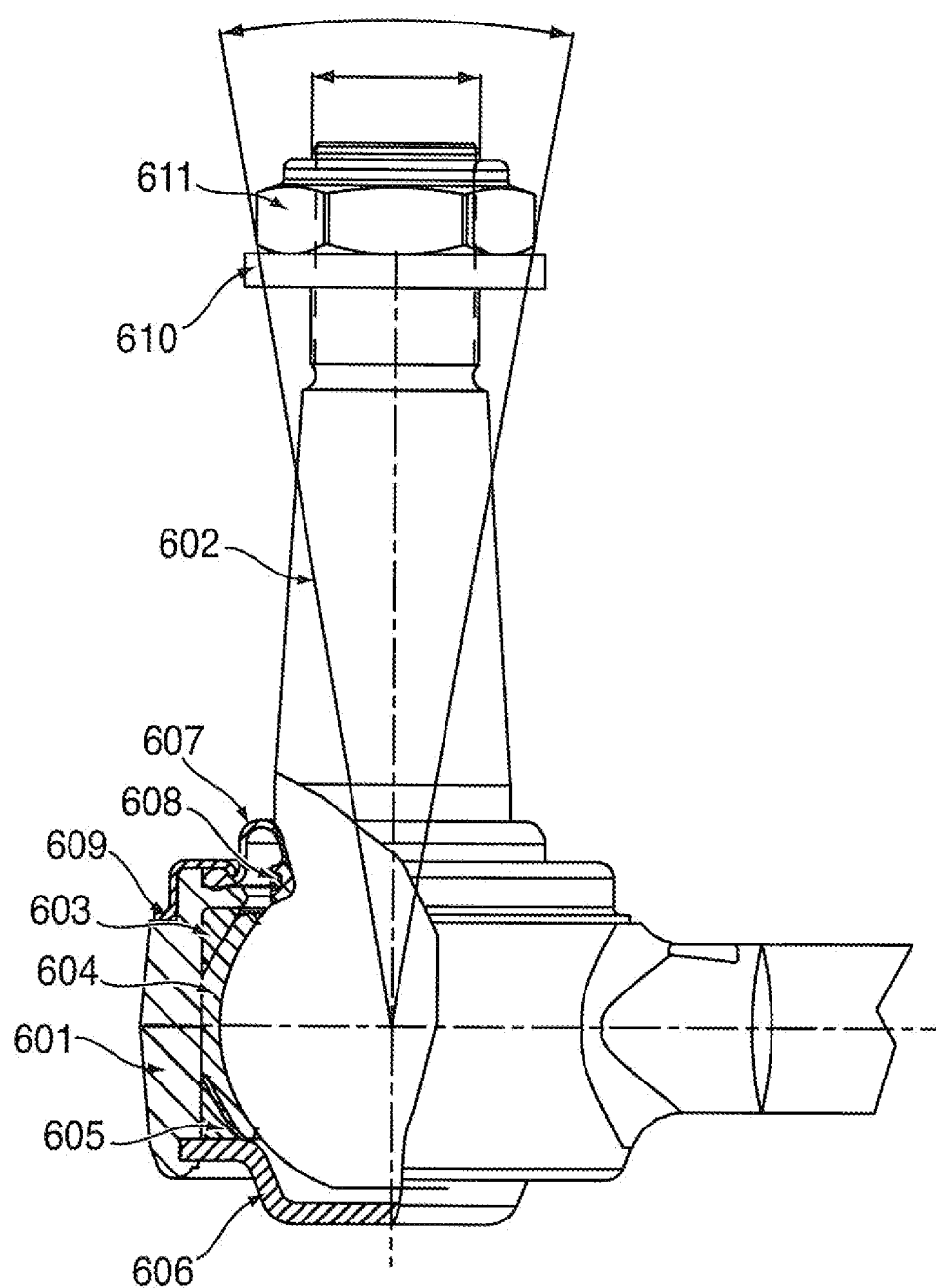
FIG. 9 shows an exploded view of an embodiment of the present invention of male assembly with a taper ball stud inner assembly.

FIG. 7 shows the engineering drawing showing dimensions and tolerances for one typical embodiment of the sealed interior of the torque rod design. The tables in the drawings also show the materials used for each component. Housing 401 is the housing made of C45 steel. It is forged and normalized to between 172-216 HB. Housing 401 contains ball pin 402, which is made of steel 41Cr4 quenched and tempered to between 23-33 HRC. Support ring (TPC) 403 is made of a thermoplastic polyurethane elastomer and contains ball pin 402 at its top and holds down center bearing 404. Center bearing 404 is made from an engineered thermoplastic. Center bearing 404 provides contact patch with ball pin 402. Support ring (metal) 405 contains this arrangement from the other side and is made from St 35 steel. Lock ring 406 holds the arrangement together and washer 407 sits between lock ring 406 and dust boot 408. Dust boot 408 covers the inner parts and protects them. Dust boot 408 also contains grease which provides constant lubrication for the inner components. Clamping ring 409 contains boot 408 inside ring 410. Clamping ring 409 is made from DIN 2076 B steel or equivalent. In embodiments which have a straddle pin (pin with mounting holes on either side) two have dust boots may be used to cover the housing on either side and in other embodiments which have ball stud (pin with a taper stud with threads on one side and a full sphere on the other side) the dust boot may cover only the top and a cap will cover the bottom. Ring 410 is made of St3 K32 steel covers wither side of the housing and is welded on to the housing. Ring 410 protects dust boot 408 and inner components. Again in embodiments that have straddle pin have the cap on both sides and embodiments with ball stud have the cap on the taper stud or upper end only. FIGS. 8 and 9 show alternative embodiments of the interior of the torque rod of the present invention.

FIG. 8 shows another embodiment of the interior of the torque rod design. This figure shows a male part with straddle ball ends. The rod end is solid with a diameter of 32 mm (1¼"). This solid rod mates with the female end. Housing 501 which includes the rod is made of normalized C45 steel hardened to 172-216 HB. Housing 501 contains ball pin 502, which is made of steel 41Cr4 quenched and tempered to between 23-33 HRC. Support ring (TPC) 503 made of a thermoplastic polyurethane elastomer and contains ball pin 502 at its top and holds down bearing 504, which is made from an engineered thermoplastic. Center bearing 504 provides contact patch with the ball pin 502. Support ring (metal) 505 contains this arrangement from the other side and is made from St 35 steel. Lock ring segment 506 holds the arrangement together and washer 507 sits between lock ring segment 506 and dust boot 508. Dust boot 508 covers the inner parts and protects them. Dust boot 508 also contains grease which provides constant lubrication for the inner components. In embodiments which have a straddle pin (pin with mounting holes on either side) two dust boots may be used to cover the housing on either side and in other embodiments which have ball stud (pin with a taper stud with threads on one side and a full sphere on the other side) dust boot 508 covers only the top and a cap will cover the bottom. Ring 510, made of St3 K32 steel covers either side of the housing and is welded on to the housing. Clamping ring 509 contains boot 508 inside ring 510. Clamping ring 509 is made from DIN 2076 B steel or equivalent. Ring 510 protects dust boot 508 and inner components. Again, in embodiments that have straddle pin have the cap on both sides and embodiments with ball stud have the cap on the taper stud or upper end only.

FIG. 9 shows another embodiment of the torque rod design. This figure shows a male part with ball stud end. The rod end is solid with a diameter of 32 mm (1¼"). This solid rod mates with the female end. Housing 601 includes the rod and is made of normalized C45 steel hardened to 172-216 HB. Housing 601 contains ball pin 602, which is made of steel 42CrMo4 and is quenched and tempered to between 26-33 HRC. Ball pin 602 has a taper stud with appropriate threads cut on the end. Ball pin 602 is used with appropriate hardware such as washer 610 and elastic lock nut 611. Support ring (TPU) 603 made of a thermoplastic polyurethane elastomer and contains ball pin 602 at the top and holds down bearing 604, which is made from an engineered thermoplastic. Bearing 604 provides contact patch with ball pin 602. Support ring (metal) 605 contains the arrangement described from the bottom and is made from St 52 steel. Cap 606 made of St3 K32 steel covers the arrangement from the bottom and seals ball pin 602 inside housing 601. Cap 606 also provides protection against vertical movements of ball pin 602 and shields the inner components from abrasives particles. Dust boot 607 covers the inner parts and protects them. Dust boot 607 also contains grease which provides constant lubrication for the inner components. Clamping ring 608, made of DIN 2076B, locks the ball pin 602 in housing 601 and holds it down. Ring 609 made of St3 K32 steel and covers the top of housing 601 and is welded on to housing 601. Ring 609 protects dust boot 607 and inner components.

Figure 10:
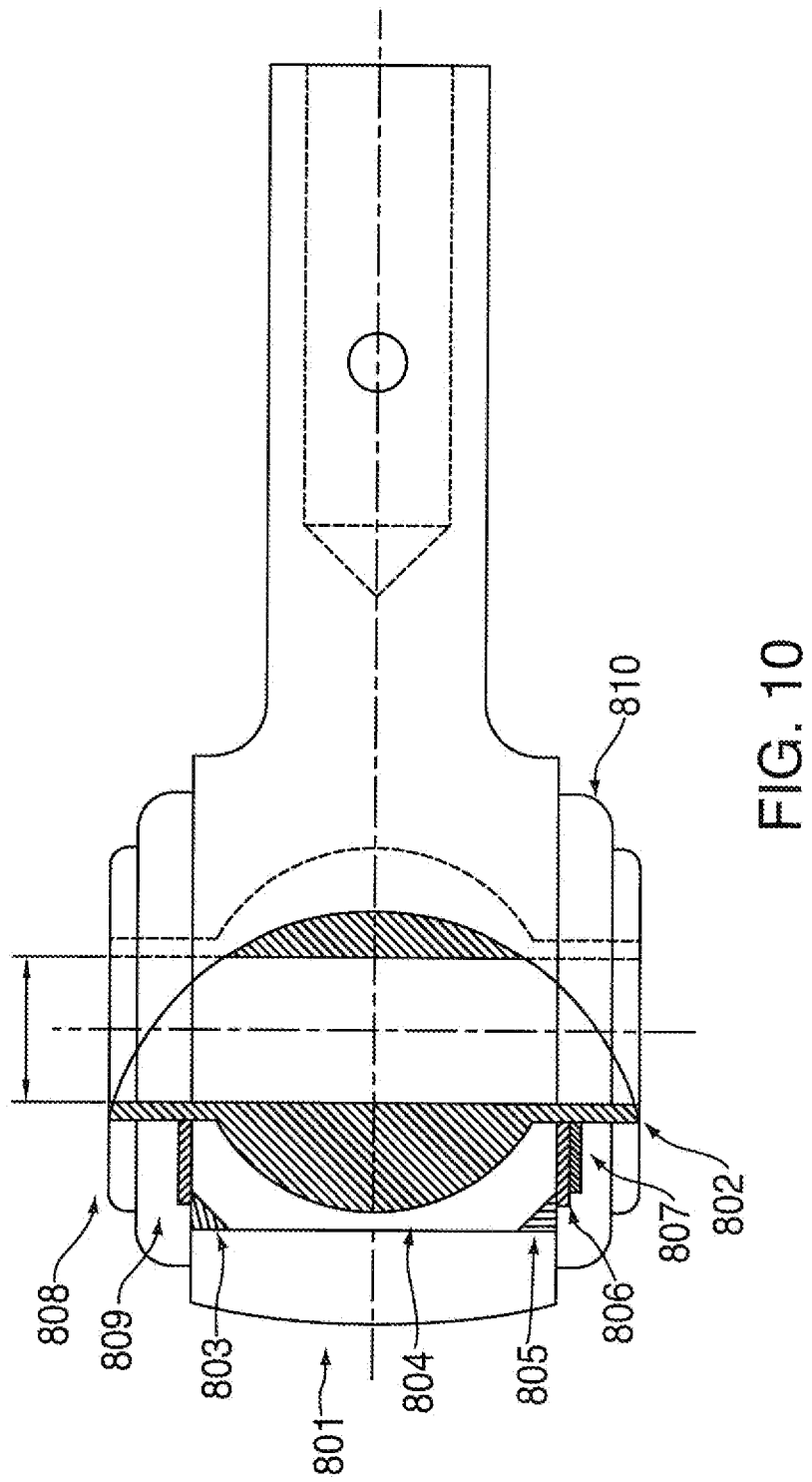
FIG. 10 shows an exploded view of an embodiment of the present invention of female assembly with a ball hollow inner assembly.

FIG. 10 shows another embodiment of the torque rod design. This figure shows a female part with hollow ball ends. The rod end is a receiver end with a fillet hole. This hollow end mates with the male end. Housing 801 is made of normalized C45 steel hardened to 172-216 HB. Housing 801 contains hollow ball 802 which is made of steel 41 Cr4 hardened to between 23-33 HB. Hollow ball 802 has a hole drilled through it (bolt hole 811) and the diameter of the hole can be as per the size of the mounting bolt required for a particular application. Support 803 made of a thermoplastic polyurethane elastomer, contains the hollow ball 802 at its top and holds down center bearing 804 which is made from Polyoxymethylene or POM. Center bearing 804 provides contact patch with the full radial ball. Support ring 805 contains this arrangement from the other side and is made from St 35 steel. Lock ring 806 holds the arrangement together and washer 807 sits between the lock ring and dust boot 808. Dust boot 808 covers the inner parts and protects them. Dust boot 808 also contains grease, which provides constant lubrication for the inner components. Dust boot 808 also covers the bottom similarly. Washer 807 is made from hardened steel and sits between lock ring 806 and dust boot 808. In embodiments which have a straddle pin (pin with mounting holes on either side) two dust boots may be used to cover the housing on either side and in other embodiments which have a ball stud (pin with a taper stud with threads on one side and a full sphere on the other side) dust boot 808 covers only the top and a cap covers the bottom. A Washer 809 is made from hardened steel and sits between lock ring 806 and dust boot 808. Cap/ring 810 made of St3 K32 steel covers either side of the housing and is welded on to the housing. This ring protects the dust boot and inner components. Again in embodiments that have straddle pin have the cap on both sides and embodiments with ball stud have the cap on the taper stud or upper end only.

Figure 11:
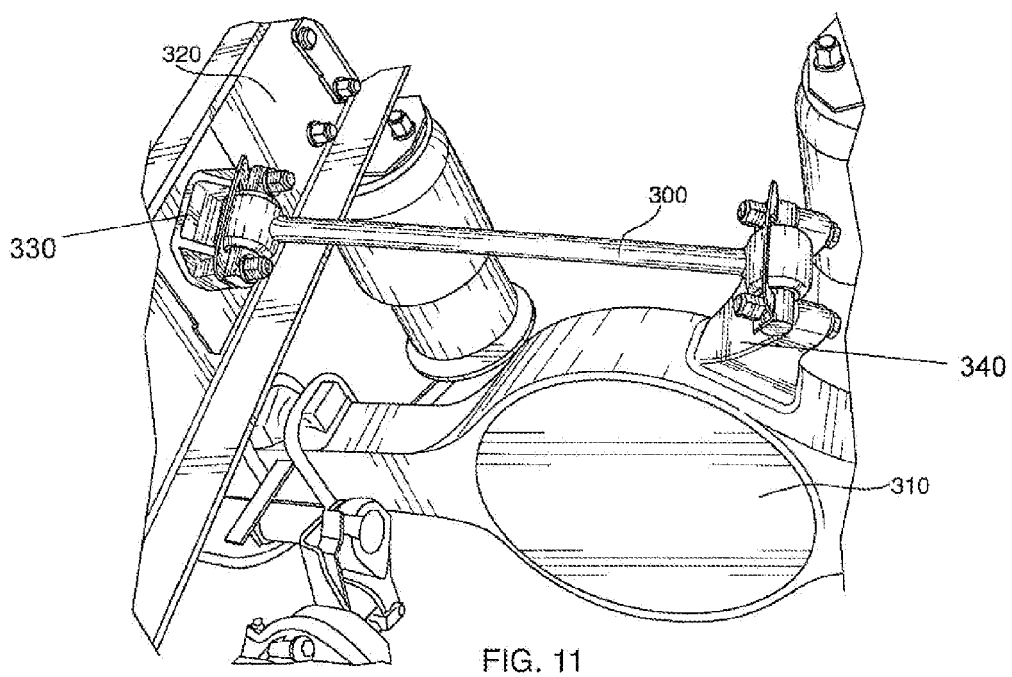
FIG. 11 shows a perspective view of a torque rod of the present invention installed in a vehicle.

FIG. 11 shows a perspective view of an installed torque rod. In FIG. 11, torque rod 700 is attached at one end to differential housing 310 and to frame rail 320 of the vehicle's chassis. Because of the perspective of the figure, the torque rod may appear asymmetrical, and the actual symmetry and shape of the torque rod is better seen in FIGS. 1-3.

It will thus be seen that the objects set forth above, among those made apparent from the preceding description, are efficiently attained and, since certain changes may be made in carrying out the above process, in the described product, and in the construction set forth without departing from the spirit and scope of the invention, it is intended that all matter contained in the above description and shown in the accompanying drawings shall be interpreted as illustrated and not in a limiting sense.

It is also to be understood that the following claims are intended to cover all of the generic and specific features of the invention herein described, and all statements of the scope of the invention which, as a matter of language, might be said to fall therebetween.

The invention claimed is:

1. An apparatus for stabilizing a vehicle comprising:
   a male section including (1) an end portion attachable to a vehicle and with an internal sealed bearing assembly received therein and (2) a connecting portion with an alignment groove; and
   a female section including (1) an end portion attachable to a vehicle and with an internal sealed bearing assembly received therein and (2) a connecting portion with a single transverse opening;
   wherein said apparatus is formed by inserting said connecting portion of said male section into said connecting portion of said female section, aligning said alignment groove with said transverse opening, and subsequently welding said male portion to said female portion by forming only one weld plug in said transverse opening where said weld plug is applied in the visible portion of said alignment groove, and where said weld plug is the only attachment of said male section and said female section.

2. The apparatus of claim 1 wherein at least one internal sealed bearing assembly of said male and female sections consists of a hollow ball assembly.

3. The apparatus of claim 1 wherein at least one of the end portions of said male or female section is perpendicular to the connecting portion of the same section.

4. The apparatus of claim 1 wherein each of said sealed bearing assemblies of said male section and said female section includes a center bearing and a radial ball inner pin.

5. The apparatus of claim 4 wherein each of said sealed bearing assemblies of said male section and female section further includes a steel outer cap and dust boot.

6. The apparatus of claim 4 wherein each of said sealed bearing assemblies of said male section and female section further includes a top bearing.

7. A method for installing a two-section torque rod in a vehicle comprising the steps of:
   attaching a first section of a torque rod to the suspension of a vehicle, said first section comprising a first end portion with an internal sealed bearing assembly and a male elongated portion with an alignment groove, by attaching said end portion to a first torque rod bracket of said suspension;
   mating a second section of the torque rod with said first section, said second section comprising a second end portion with an internal sealed bearing assembly and a female elongated portion with a single transverse opening, said transverse opening allowing visibility with said alignment groove, by inserting said male elongated portion into said female elongated portion;
   aligning said alignment groove with said transverse opening;
   attaching said second section to the suspension of the vehicle by attaching said second end portion to a second torque rod bracket of said suspension; and
   welding said male elongation portion to said female elongated portion using only one weld plug in said transverse opening, where said weld plug is the only attachment of said alignment groove of said first section and said second section.

8. The method of claim 7 wherein the end portion of at least one of the first and second sections is perpendicularly attached to the elongated portion of the same section.

9. A torque rod comprising:
   a first section including (1) a hollow end portion for attaching to a vehicle with a first bearing assembly receiving therein and (2) a connecting portion with an alignment groove;
   a second section including (1) a hollow end portion for attaching to a vehicle with a second bearing assembly received therein and (2) a connecting portion with a single transverse opening in a channel for aligning with said alignment groove;
   wherein said apparatus is formed by the connecting portion of said first section being mated and aligned with the connecting portion of said second section by aligning said alignment groove with said transverse opening and subsequently welding said first section and said second section together with only one weld plug, thereby forming the only bond between said first section at said alignment groove and said second section at said transverse opening.

10. The torque rod of claim 9 wherein at least one of said first and second bearing assemblies is comprised of a hollow ball assembly.

11. The torque rod of claim 9 wherein the end portion of one of said first or second sections is perpendicularly attached to the connecting portion of the same section.

12. The torque rod of claim 9 wherein each bearing assembly includes a steel outer cap and dust cap.

13. The torque rod of claim 9 wherein each bearing assembly is sealed and includes a center bearing and a radial ball inner pin.

14. The torque rod of claim 9 wherein each bearing assembly includes a center bearing and a top bearing.

15. The apparatus of claim 1 wherein at least one internal sealed bearing assembly of each of said male and female sections consists of a straddle pin or ball stud.

16. The method of claim 7 wherein at least one of said sealed beam assemblies includes a hollow ball.

17. The torque rod of claim 9 wherein at least one of said first and second bearing assemblies is comprised of a straddle pin or ball stud.

* * * * *